(12) United States Patent
Buse et al.

(10) Patent No.: US 11,794,189 B2
(45) Date of Patent: Oct. 24, 2023

(54) FLUID CONTAINER

(71) Applicant: Gen-Probe Incorporated, San Diego, CA (US)

(72) Inventors: David Buse, San Diego, CA (US); Byron J. Knight, San Diego, CA (US)

(73) Assignee: GEN-PROBE INCORPORATED, San Diego, CA (US)

( * ) Notice: Subject to any disclaimer, the term of this patent is extended or adjusted under 35 U.S.C. 154(b) by 267 days.

(21) Appl. No.: 17/210,040

(22) Filed: Mar. 23, 2021

(65) Prior Publication Data

US 2021/0299664 A1 Sep. 30, 2021

Related U.S. Application Data

(60) Provisional application No. 62/994,552, filed on Mar. 25, 2020.

(51) Int. Cl.
*B01L 3/00* (2006.01)
*B65D 51/00* (2006.01)

(52) U.S. Cl.
CPC ............ *B01L 3/523* (2013.01); *B65D 51/002* (2013.01); *B01L 2200/16* (2013.01);
(Continued)

(58) Field of Classification Search
CPC ................. B01L 3/523; B01L 2200/16; B01L 2300/044; B01L 2300/0858; B01L 2300/123; B65D 51/002
See application file for complete search history.

(56) References Cited

U.S. PATENT DOCUMENTS 7,666,359 B2   2/2010  Sattler et al.
8,202,495 B1 *  6/2012  Smith ................. B01L 3/0275
                                                           422/511
(Continued)

FOREIGN PATENT DOCUMENTS

DE    202006017454 U1   6/2007
EP       0136125 A2 *  4/1985
(Continued)

OTHER PUBLICATIONS

PCT Notification of Transmittal of the International Search Report and the Written Opinion of the International Search Authority, International Application No. PCT/US2021/023683, dated Jul. 1, 2021.

*Primary Examiner* — Jill A Warden
*Assistant Examiner* — Alex Ramirez
(74) *Attorney, Agent, or Firm* — Rothwell, Figg, Ernst & Manbeck, P.C.; Richard Wydeven; Charles B. Cappellari

(57) ABSTRACT

A container includes a base with a top wall, a vessel depending from a top wall aperture in the top wall, a fluid retainer projecting above the top wall and surrounding the top wall aperture, and a skirt surrounding the vessel and including opposed grooves for gripping the container. A lid is disposed on a top end of the base and includes a cover wall with a lid aperture generally aligned with the top wall aperture of the base. A septum is disposed between the top wall of the base and the cover wall with a portion of the septum disposed between the lid aperture and the top wall aperture. Fluid retainer/return structure is configured to prevent fluid deposited on the septum from dripping off the container and to allow at least a portion of the fluid deposited on the septum to run off the septum and into the vessel.

30 Claims, 7 Drawing Sheets

(52) U.S. Cl.
CPC . *B01L 2300/044* (2013.01); *B01L 2300/0858* (2013.01); *B01L 2300/123* (2013.01)

(56)  References Cited

U.S. PATENT DOCUMENTS

| | | | |
|---|---|---|---|
| 8,349,564 | B2 | 1/2013 | Macioszek et al. |
| 8,926,921 | B2 | 1/2015 | Rousseau et al. |
| 9,476,895 | B2 | 10/2016 | Self et al. |
| 2010/0028215 | A1 | 2/2010 | Schenk |
| 2014/0174978 | A1* | 6/2014 | Jakobsen ................. G21F 5/12 220/802 |
| 2019/0092555 | A1* | 3/2019 | Ma ....................... B01L 3/5453 |
| 2019/0307382 | A1 | 10/2019 | Fedoruk et al. |
| 2020/0222896 | A1* | 7/2020 | Booker ................... B01L 3/523 |

FOREIGN PATENT DOCUMENTS

| | | |
|---|---|---|
| EP | 3144241 A1 | 3/2017 |
| WO | 2011091013 A1 | 7/2011 |
| WO | 2017087176 A1 | 5/2017 |
| WO | 2019159111 A1 | 8/2019 |

\* cited by examiner

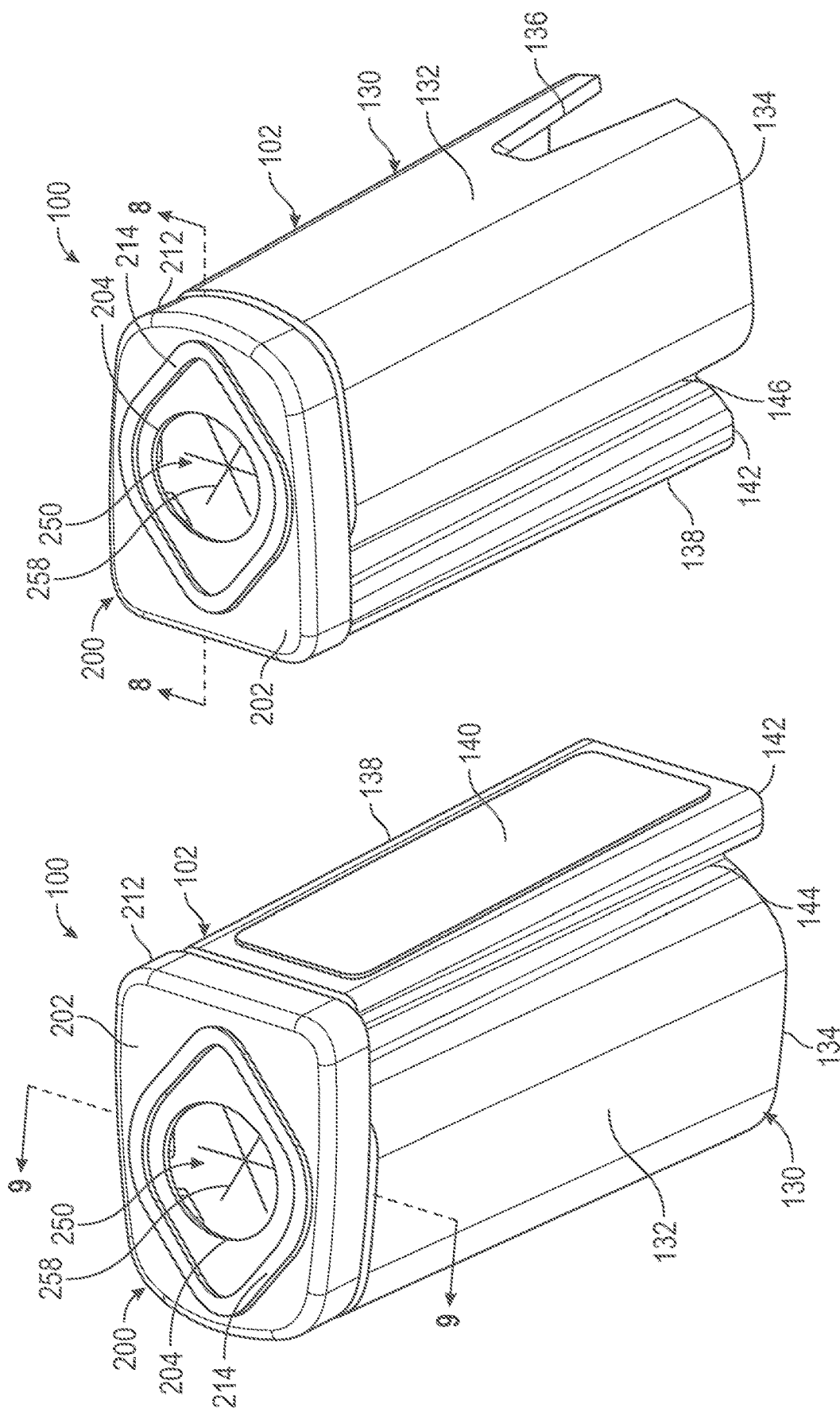

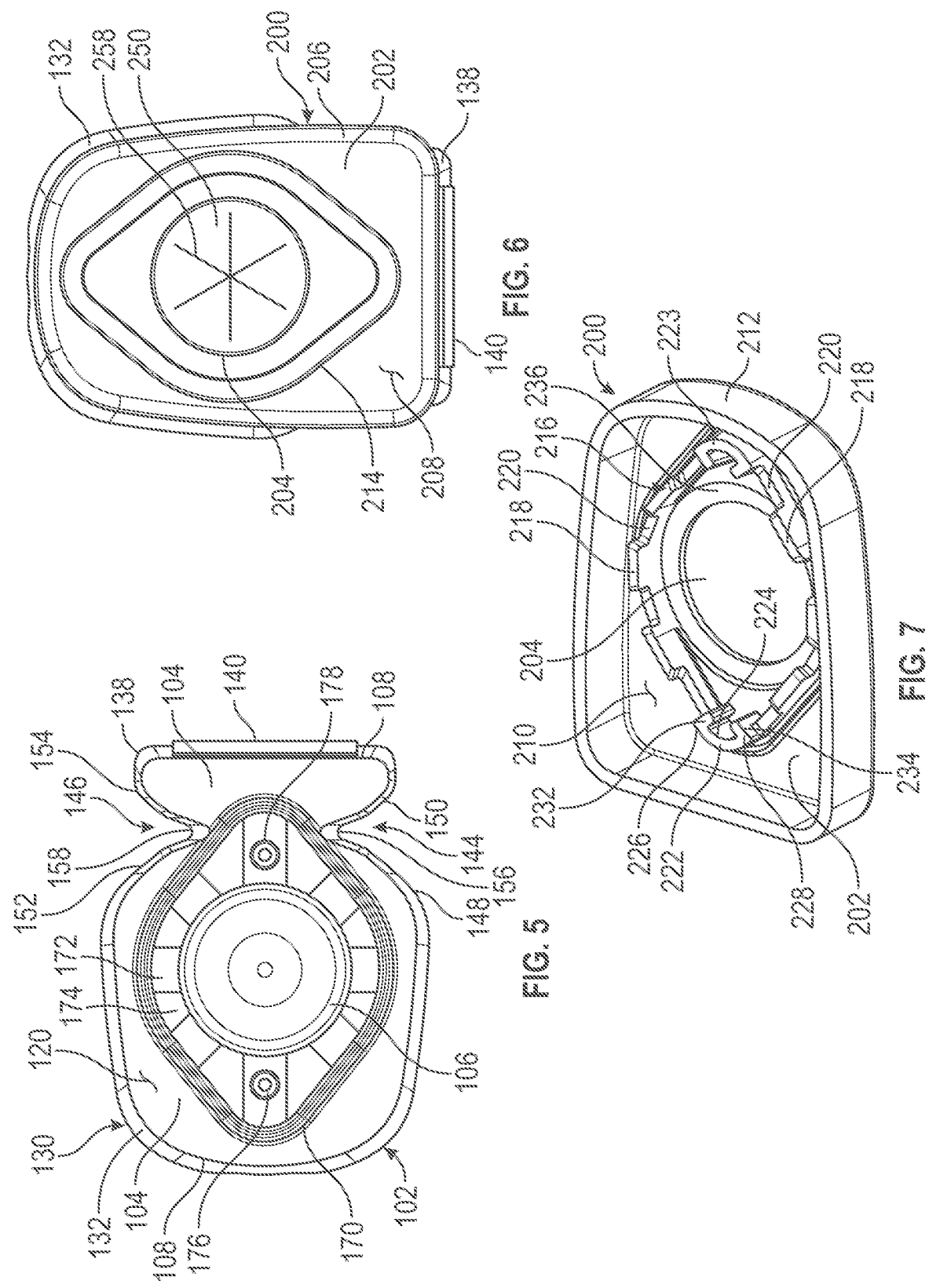

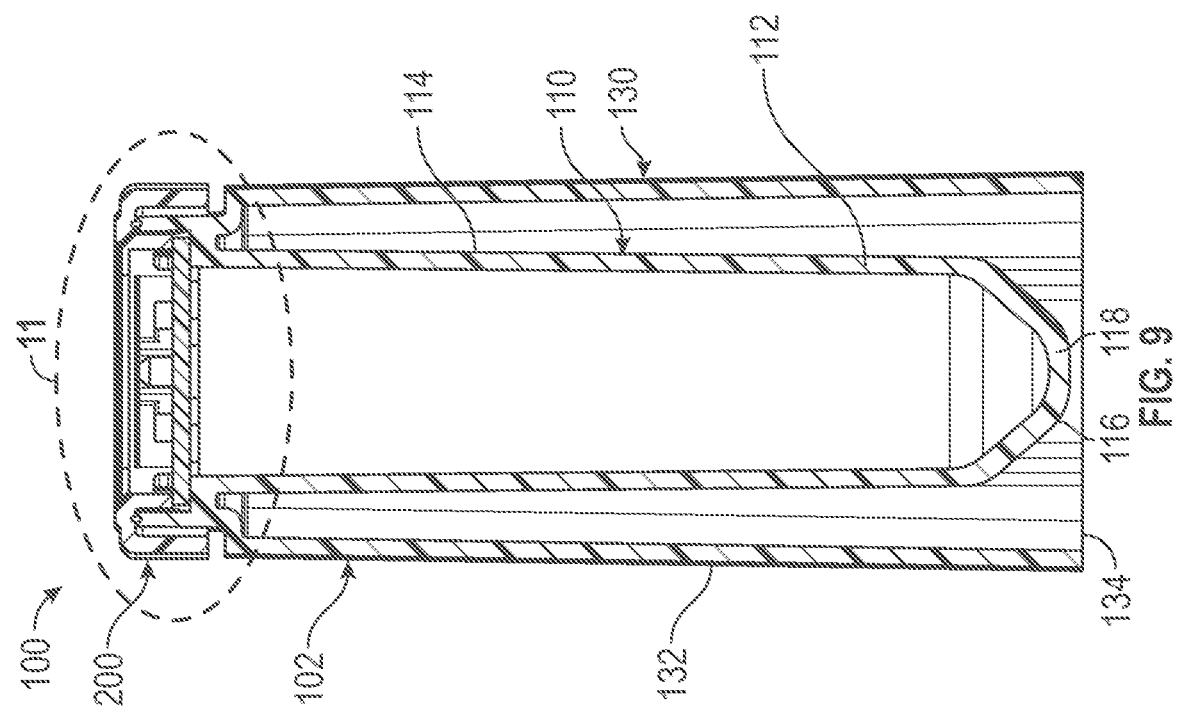
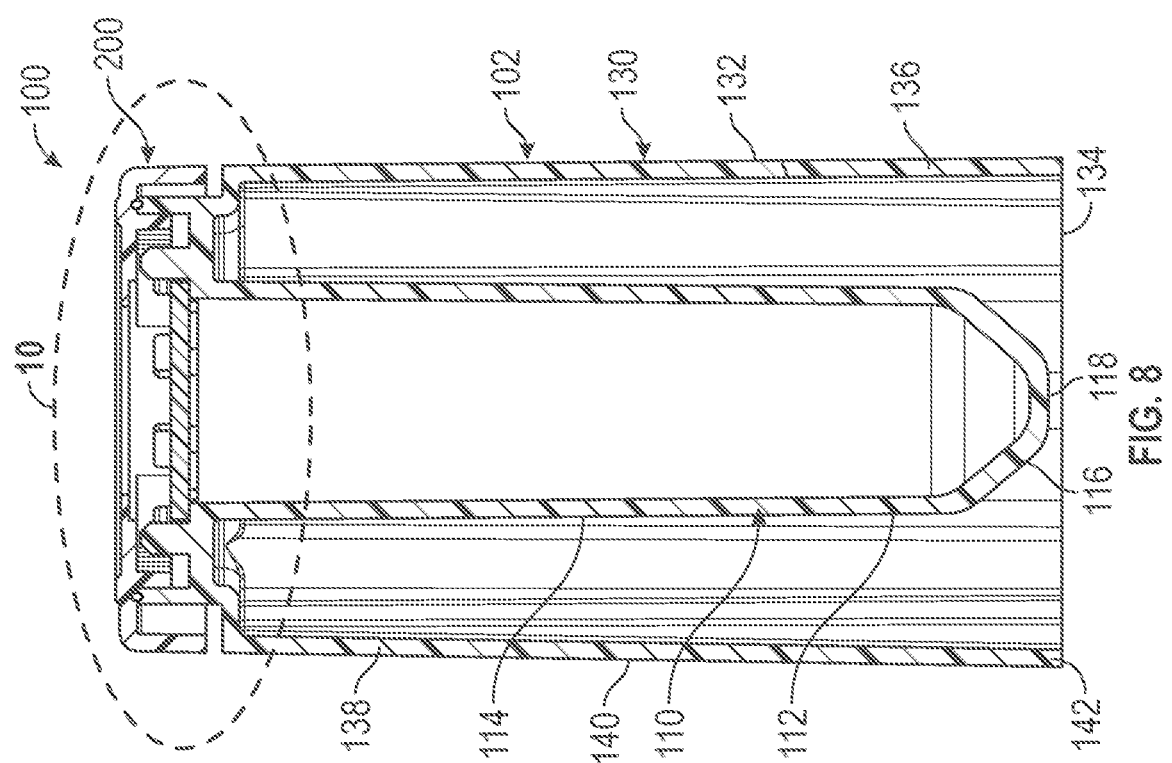

FLUID CONTAINER

CROSS-REFERENCE OF RELATED APPLICATION

This application claims the benefit under 35 U.S.C. § 119(e) of the filing date of U.S. Provisional Patent Application No. 62/994,552 filed Mar. 25, 2020, the disclosure of which is incorporated herein by reference.

FIELD OF THE DISCLOSURE

This disclosure relates to a fluid container for use in automated processing instruments.

BACKGROUND

Automated processing instruments, such as analyzers for performing chemical and/or biological tests or assays, employ fluid containers that are automatically manipulated—e.g., grasped and/or moved from one location in the instrument to another by a robotic transfer device. To ensure secure and precise manipulation of the fluid container by the robotic transfer device, the container should be securely and repeatably graspable by the robotic transfer device.

In addition, fluids may be removed from and/or dispensed into the fluid container by a robotic fluid transfer device, such as a robotic pipettor that inserts a hollow probe into an opening of the container to dispense and/or remove fluid. Minimizing fluid spillage within the instrument is important for maintaining instrument cleanliness and to avoid cross-contamination. Robotic fluid transfer mechanisms, such as pipettors, maybe a source of fluid dripping within the instrument as fluid adhere to the outer surface of a pipettor probe may drip from the probe and onto an unintended surface within the instrument.

Thus, features of a container that help reduce the amount of fluid adhered to the exterior of the fluid probe may help reduce spills within the instrument.

SUMMARY

The following presents a simplified summary in order to provide a basic understanding of some aspects described herein. This summary is not an extensive overview of the claimed subject matter. It is intended to neither identify key or critical elements of the claimed subject matter nor delineate the scope thereof. Its sole purpose is to present some concepts in a simplified form as a prelude to the more detailed description that is presented later.

Aspects of the disclosure are embodied in a container that includes a base and a lid disposed on a top end of the base. The base includes a top wall and a fluid vessel depending from the top wall and extending from a top wall aperture formed in the top wall to a bottom end of the fluid vessel. A first wall segment is oriented transversely to the top wall and depends from a first perimeter segment of the top wall, and a second wall segment is oriented transversely to the top wall and depends from a second perimeter segment of the top wall. The first wall segment extends from the first perimeter segment of the top wall to a bottom edge of the first wall segment and at least partially surrounds the fluid vessel, and at least a portion of the bottom edge of the first wall segment is disposed below the bottom end of the fluid vessel. The second wall segment extends from the second perimeter segment of the top wall to a bottom edge of the second wall segment.

The base may further include an alignment notch formed in the first wall segment and extending upwardly from the bottom edge of the first wall segment.

The base may further include grooves formed on opposed sides of the base, and each groove is defined by opposed, exteriorly-convex surfaces converging towards a root of the groove. One of the opposed, exteriorly-convex surfaces of each groove includes part of the first wall segment, and the other of the opposed, exteriorly-convex surfaces of each groove includes part of the second wall segment. The root of each groove separates the first wall segment and the second wall segment.

The base may further include a first fluid retainer barrier projecting above a top surface of the top wall. The fluid retainer barrier extends continuously around the top wall aperture and is spaced from the perimeter of the top wall aperture.

The base may further include a plurality of alternating merlons and crenels disposed on the top surface of the top wall and surrounding the top wall aperture within the space between the first fluid retainer barrier and a perimeter of the top wall aperture.

The base may further include connecting posts projecting above the top surface of the top wall. Each connecting posts is disposed on an opposed side of the top wall aperture. Each post may be disposed on one of the plurality of merlons within the space between the first fluid retainer barrier and the perimeter of the top wall aperture.

The lid includes a cover wall disposed at a spaced-apart position above the top wall of the base. The cover wall has formed therein a lid aperture generally aligned with the top wall aperture of the base. The lid further includes a perimeter wall that is oriented transversely to the cover wall and depends from a perimeter of the cover wall. The perimeter wall surrounds the first fluid retainer barrier of the base, and at least a portion of the perimeter wall is coplanar with a first portion of the first wall segment of the base, and a second portion of the perimeter wall is coplanar with at least a portion of the second wall segment of the base.

The lid may further include a second fluid retainer barrier projecting above a top surface of the cover wall. The second fluid retainer barrier extends continuously around the lid aperture and is spaced from a perimeter of the lid aperture.

The lid may further include a lid wall projecting below a bottom surface of the cover wall. The lid wall is oriented transversely to the bottom surface of the cover wall and extends continuously around the lid aperture and is spaced from the perimeter of the lid aperture. The lid wall may be configured to have a conforming fit within an interior surface of the first fluid retainer barrier of the base.

The lid may further include a plurality of alternating merlons and crenels forming a free edge of the lid wall. Each of the plurality of alternating merlons and crenels of the lid wall of the lid may be disposed in opposed alignment with an associated one of the alternating merlons and crenels of the top wall of the base.

A merlon of the lid wall on each of two opposed sides of the lid aperture may define a post capture pocket, where the post capture pocket includes a curved first segment, a second segment connected to a first end of the first segment and extending transversely from a concave side of the first segment, and a third segment connected to a second end of the first segment and extending transversely from the concave side of the first segment. The second and third segments are arranged with converging orientations, and each post capture pocket is configured to receive one of the connecting posts between the respective first, second, and third segments thereof.

The lid may further include an annular relief formed on the bottom surface of the cover wall. The annular relief has an inner edge that is coextensive with the perimeter of the lid aperture.

The container may further include an elastomeric septum disposed within the first fluid retainer barrier of the base and overlying the top wall aperture and the plurality of alternating merlons and crenels of the top wall. The septum is at least partially retained by means of the connecting posts extending through holes formed through the septum and aligned with the posts. A perimeter of the septum is sandwiched between merlons of the base and opposed, associated merlons of the lid wall. The septum may include a plurality of slits formed through a portion of the septum between the lid aperture and the top wall aperture and configured to permit a pipette tip to pass through the septum and into the fluid vessel of the base.

Further aspects of the disclosure are embodied in a container that includes a top wall a fluid vessel depending from the top wall and extending from a top wall aperture formed in the top wall to a bottom end of the fluid vessel, a first wall segment depending from a first perimeter segment of the top wall, a second wall segment depending from a second perimeter segment of the top wall, and grooves formed on opposed sides of the container. The first wall segment extends from the first perimeter segment of the top wall to a bottom edge of the first wall segment and at least partially surrounds the fluid vessel, and at least a portion of the bottom edge of the first wall segment is disposed below the bottom end of the fluid vessel. The second wall segment extends from the second perimeter segment of the top wall to a bottom edge of the second wall segment. Each groove is defined by opposed, exteriorly-convex surfaces converging towards a root of the groove. One of the opposed, exteriorly-convex surfaces of each groove includes part of the first wall segment and the other of the opposed, exteriorly-convex surfaces of each groove includes part of the second wall segment, and the root of each groove separates the first wall segment and the second wall segment.

According to other aspects of the disclosure, the first wall segment is oriented transversely to the top wall, and the second wall segment is oriented transversely to the top wall.

According to other aspects of the disclosure, the first wall segment includes an alignment notch formed in the first wall segment and extending upwardly from the bottom edge of the first wall segment.

According to other aspects of the disclosure, the base further includes a machine-readable label disposed on the second wall segment.

According to other aspects of the disclosure, the first wall segment has a uniform height from the first perimeter segment of the top wall to the bottom edge of the first wall segment.

According to other aspects of the disclosure, the second wall segment has a uniform height from the second perimeter segment of the top wall to the bottom edge of the second wall segment, and the height of the second wall segment is equal to the height of the first wall segment.

According to other aspects of the disclosure, the grooves extend from the top wall to the bottom edges of the first wall segment and the second wall segment.

According to other aspects of the disclosure, the base further includes a top wall fluid retainer barrier projecting above a top surface of the top wall, and the top wall fluid retainer barrier extends continuously around the top wall aperture and is spaced from a perimeter of the top wall aperture.

According to other aspects of the disclosure, the base further includes a plurality of alternating merlons and crenels disposed on the top surface of the top wall and surrounding the top wall aperture within the space between the top wall fluid retainer barrier and the perimeter of the top wall aperture.

According to other aspects of the disclosure, the base further includes connecting posts projecting above the top surface of the top wall, and each of the connecting posts is disposed on an opposed side of the top wall aperture and is disposed within the space between the top wall fluid retainer barrier and the perimeter of the top wall aperture.

According to other aspects of the disclosure, the container further includes a lid, and the lid includes a cover wall disposed at a spaced-apart position above the top wall of the base and having formed therein a lid aperture generally aligned with the top wall aperture and a perimeter wall depending from a perimeter of the cover wall.

According to other aspects of the disclosure, the perimeter wall is oriented transversely to the cover wall.

According to other aspects of the disclosure, at least a portion of the perimeter wall is coplanar with at least a portion of the first wall segment and a second portion of the perimeter wall is coplanar with at least a portion of the second wall segment.

According to other aspects of the disclosure, the lid further includes a cover wall fluid retainer barrier projecting above a top surface of the cover wall, where the cover wall fluid retainer barrier extends continuously around the lid aperture and is spaced from the perimeter of the lid aperture.

According to other aspects of the disclosure, the lid further includes a lid wall projecting below a bottom surface of the cover wall, and the lid wall extends continuously around the lid aperture and is spaced from a perimeter of the lid aperture.

According to other aspects of the disclosure, the lid wall is oriented transversely to the bottom surface of the cover wall.

According to other aspects of the disclosure, the lid wall includes a plurality of alternating merlons and crenels forming a free edge of the lid wall.

According to other aspects of the disclosure, the lid further includes an annular relief formed on the bottom surface of the cover wall and having an inner edge that is coextensive with the perimeter of the lid aperture.

According to other aspects of the disclosure, the container further includes an elastomeric septum disposed within the top wall fluid retainer barrier and overlying the top wall aperture. The septum is at least partially retained by the connecting posts extending through holes formed through the septum and aligned with the posts, and the septum may include a plurality of slits formed through a portion of the septum overlying the top wall aperture and configured to permit a pipette tip to pass through the septum and into the fluid vessel.

According to other aspects of the disclosure, the perimeter wall surrounds the top wall fluid retainer barrier.

According to other aspects of the disclosure, the lid wall is configured to have a conforming fit within an interior surface of the top wall fluid retainer barrier.

According to other aspects of the disclosure, the container is made of plastic.

According to other aspects of the disclosure, the container is at least partially translucent.

According to other aspects of the disclosure, the fluid vessel contains a reagent for performing a molecular assay.

Further aspects of the disclosure are embodied in a container that includes a top wall, a fluid vessel depending from the top wall and extending from a top wall aperture formed in the top wall to a bottom end of the fluid vessel, a first wall segment depending from a first perimeter segment of the top wall, and a top wall fluid retainer barrier projecting above a top surface of the top wall. The first wall segment extends from the first perimeter segment of the top wall to a bottom edge of the first wall segment and at least partially surrounds the fluid vessel, and at least a portion of the bottom edge of the first wall segment is disposed below the bottom end of the fluid vessel. The container may further include an alignment notch formed in the first wall segment and extending upwardly from the bottom edge of the first wall segment. The top wall fluid retainer barrier extends continuously around the top wall aperture and is spaced from a perimeter of the top wall aperture.

According to other aspects of the disclosure, the container further includes a second wall segment depending from a second perimeter segment of the top wall, and the second wall segment extends from the second perimeter segment of the top wall to a bottom edge of the second wall segment.

According to other aspects of the disclosure, each of the first and second wall segments is oriented transversely to the top wall.

According to other aspects of the disclosure, the container further includes grooves formed on opposed sides of the container. Each groove defined by opposed, exteriorly-convex surfaces converging towards a root of the groove. One of the opposed, exteriorly-convex surfaces of each groove includes part of the first wall segment and the other of the opposed, exteriorly-convex surfaces of each groove includes part of the second wall segment, and the root of each groove separates the first wall segment and the second wall segment.

According to other aspects of the disclosure, the container further includes a lid, and the lid includes a cover wall disposed at a spaced-apart position above the top wall and having formed therein a lid aperture generally aligned with the top wall aperture, and a perimeter wall depending from a perimeter of the cover wall. At least a first portion of the perimeter wall is coplanar with at least a portion of the first wall segment.

According to other aspects of the disclosure, the container further includes connecting posts projecting above the top surface of the top wall. Each of the connecting posts is disposed on an opposed side of the top wall aperture and is disposed within the space between the top wall fluid retainer barrier and the perimeter of the top wall aperture, and the septum is at least partially retained by the connecting posts extending through holes formed through the septum and aligned with the posts.

According to other aspects of the disclosure, the container further includes a lid that includes a cover wall disposed at a spaced-apart position above the top wall and having formed therein an aperture generally aligned with the top wall aperture and a perimeter wall depending from a perimeter of the cover wall. The perimeter wall surrounds the top wall fluid retainer barrier.

According to other aspects of the disclosure, the container further includes a lid wall projecting below a bottom surface of the cover wall. The lid wall extends continuously around the lid aperture and is spaced from the perimeter of the lid aperture and is configured to have a conforming fit within an interior surface of the top wall fluid retainer barrier.

Further aspects of the disclosure are embodied in a container that includes a base and a lid disposed on a top end of the base. The bases includes a top wall, a fluid vessel depending from the top wall and extending from a top wall aperture formed in the top wall to a bottom end of the fluid vessel, and a first fluid retainer barrier projecting above a top surface of the top wall. The first fluid retainer barrier extends continuously around the top wall aperture and is spaced from a perimeter of the top wall aperture. The lid includes a cover wall disposed at a spaced-apart position above the top wall of the base and having formed therein a lid aperture generally aligned with the top wall aperture of the base and a lid wall projecting below a bottom surface of the cover wall. The lid wall extends continuously around the lid aperture and is spaced from a perimeter of the lid aperture, and where the lid wall is configured to have a conforming fit within an interior surface of the first fluid retainer barrier of the base.

Further aspects of the disclosure are embodied in a container that includes a top wall, a fluid vessel depending from the top wall and extending from a top wall aperture formed in the top wall to a bottom end of the fluid vessel, a first wall segment depending from a first perimeter segment of the top wall, and a second wall segment depending from a second perimeter segment of the top wall. The first wall segment extends from the first perimeter segment of the top wall to a bottom edge of the first wall segment and at least partially surrounds the fluid vessel, and at least a portion of the bottom edge of the first wall segment is disposed below the bottom end of the fluid vessel. The second wall segment extends from the second perimeter segment of the top wall to a bottom edge of the second wall segment. Grooves are formed on opposed sides of the base, and each groove is defined by opposed, exteriorly-convex surfaces converging towards a root of the groove. One of the opposed, exteriorly-convex surfaces of each groove includes part of the first wall segment, and the other of the opposed, exteriorly-convex surfaces of each groove includes part of the second wall segment, and the root of each groove separates the first wall segment and the second wall segment. A first fluid retainer barrier projects above a top surface of the top wall. The first fluid retainer barrier extends continuously around the top wall aperture and is spaced from the perimeter of the top wall aperture. A plurality of alternating merlons and crenels are disposed on the top surface of the top wall and surround the top wall aperture within the space between the first fluid retainer barrier and a perimeter of the top wall aperture. Connecting posts project above the top surface of the top wall, and each of the connecting posts is disposed on an opposed side of the top wall aperture and is disposed on one of the plurality of merlons within the space between the first fluid retainer barrier and the perimeter of the top wall aperture. An elastomeric septum is disposed within the first fluid retainer barrier and overlies the top wall aperture and the plurality of alternating merlons and crenels of the top wall. The septum is at least partially retained by the connecting posts extending through holes formed through the septum and aligned with the posts, and a perimeter of the septum is sandwiched between merlons of the base and opposed, associated merlons of the lid wall. The septum includes a plurality of slits formed through a portion of the septum overlying the top wall aperture and configured to permit a pipette tip to pass through the septum and into the fluid vessel.

Further aspects of the disclosure are embodied in a container that includes a base and a lid disposed on a top end of the base. The base includes a top wall, a fluid vessel depending from the top wall and extending from a top wall aperture formed in the top wall to a bottom end of the fluid vessel, a first fluid retainer barrier projecting above a top surface of the top wall, and connecting posts projecting above the top surface of the top wall. The first fluid retainer barrier extends continuously around the top wall aperture and is spaced from a perimeter of the top wall aperture. Each of the connecting posts is disposed on an opposed side of the top wall aperture and is disposed within the space between the first fluid retainer barrier and the perimeter of the top wall aperture. The lid includes a cover wall disposed at a spaced-apart position above the top wall of the base and having formed therein a lid aperture generally aligned with the top wall aperture of the base. The lid further includes perimeter wall depending from the perimeter of the cover wall, where the perimeter wall surrounds the first fluid retainer barrier of the base, a lid wall projecting below a bottom surface of the cover wall, where the lid wall extends continuously around the lid aperture, and post capture pockets secured to the bottom surface of the cover wall, where each connecting post of the base is inserted into one of the post capture pockets. An elastomeric septum is disposed within the first fluid retainer barrier and overlies the top wall aperture. The septum is at least partially retained by the connecting posts extending through holes formed through the septum and into the post capture pockets.

Further aspects of the disclosure are embodied in a container that includes a base and a lid disposed on a top end of the base. The base includes a top wall and a fluid vessel depending from the top wall and extending from a top wall aperture formed in the top wall to a bottom end of the fluid vessel. The lid includes a cover wall disposed at a spaced-apart position above the top wall of the base and having formed therein a lid aperture generally aligned with the top wall aperture of the base and a lid wall projecting below a bottom surface of the cover wall. The lid wall extends continuously around the lid aperture and is spaced from a perimeter of the lid aperture. A septum overlies the top wall with a portion of the septum disposed between the lid aperture and the top wall aperture and is configured to permit a pipette tip to pass through the septum and into the fluid vessel. A fluid retainer/return structure is configured to prevent fluid deposited on the septum from dripping off the container and to allow at least a portion of the fluid deposited on the septum to run off the septum and into the fluid vessel.

According to other aspects of the disclosure, lid further includes a perimeter wall depending from a perimeter of the cover wall.

According to other aspects of the disclosure, the perimeter wall of the lid is oriented transversely to the cover wall.

According to other aspects of the disclosure, the fluid retainer/return structure includes a top wall fluid retainer barrier projecting above a top surface of the top wall, extending continuously around the top wall aperture, and spaced from a perimeter of the top wall aperture. A plurality of alternating merlons and crenels are disposed on the top surface of the top wall and surround the top wall aperture within the space between the top wall fluid retainer barrier and the perimeter of the top wall aperture. A cover wall fluid retainer barrier projects above a top surface of the cover wall, extending continuously around the lid aperture and spaced from the perimeter of the lid aperture. A lid wall projects below a bottom surface of the cover wall, extending continuously around the lid aperture and spaced from the perimeter of the lid aperture. A plurality of alternating merlons and crenels form a free edge of the lid wall. Each of the plurality of alternating merlons and crenels of the lid wall is disposed in opposed alignment with an associated one of the alternating merlons and crenels of the top wall.

Further aspects of the disclosure are embodied in a container that includes a top wall, a fluid vessel depending from the top wall and extending from a top wall aperture formed in the top wall to a bottom end of the fluid vessel, and gripping structures. The gripping structures are configured to enable an automated gripping mechanism to securely grip the container in a repeatable position and orientation with respect to container-gripping components of the gripping mechanism.

According to other aspects of the disclosure, the container further includes a first wall segment depending from a first perimeter segment of the top wall and a second wall segment depending from a second perimeter segment of the top wall. The first wall segment extends from the first perimeter segment of the top wall to a bottom edge of the first wall segment and at least partially surrounds the fluid vessel, and at least a portion of the bottom edge of the first wall segment is disposed below the bottom end of the fluid vessel. The second wall segment extends from the second perimeter segment of the top wall to a bottom edge of the second wall segment. The gripping structures include grooves formed on opposed sides of the container. Each groove is defined by opposed, exteriorly-convex surfaces converging towards a root of the groove. One of the opposed, exteriorly-convex surfaces of each groove includes part of the first wall segment, and the other of the opposed, exteriorly-convex surfaces of each groove includes part of the second wall segment. The root of each groove separates the first wall segment and the second wall segment.

Other features and characteristics of the subject matter of this disclosure, as well as the methods of operation, functions of related elements of structure and the combination of parts, and economies of manufacture, will become more apparent upon consideration of the following description and the appended claims with reference to the accompanying drawings, all of which form a part of this specification, where like reference numerals designate corresponding parts in the various figures.

BRIEF DESCRIPTION OF THE DRAWINGS

The accompanying drawings, which are incorporated herein and form part of the specification, illustrate various embodiments of the subject matter of this disclosure. In the drawings, like reference numbers indicate identical or functionally similar elements.

FIG. 1 is a top, front perspective view of a container as described herein.

FIG. 2 is a top, rear perspective view of the container.

FIG. 5 is a top plan view of the container with a lid omitted.

FIG. 6 is a top plan view of the container, including the lid.

FIG. 7 is an inverted, perspective view of the lid of the container.

FIG. 8 is a transverse cross-section of the container along the line 8-8 in FIG. 2.

FIG. 9 is a transverse cross-section of the container along the line 9-9 in FIG. 1.

DETAILED DESCRIPTION

Figure 3:
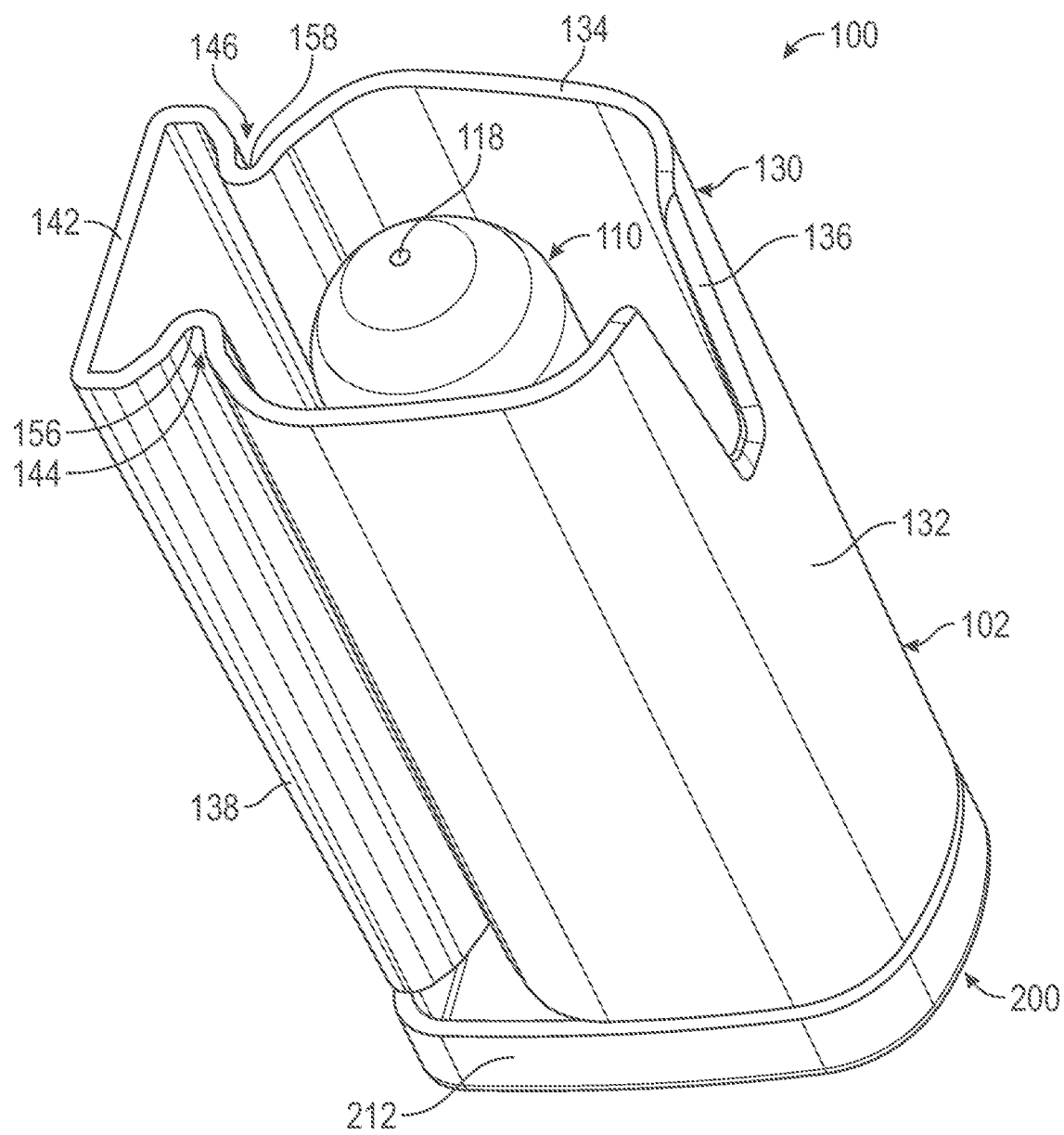
FIG. 3 is an inverted, perspective view of the container.

While aspects of the subject matter of the present disclosure may be embodied in a variety of forms, the following description and accompanying drawings are merely intended to disclose some of these forms as specific examples of the subject matter. Accordingly, the subject matter of this disclosure is not intended to be limited to the forms or embodiments so described and illustrated.

Unless defined otherwise, all terms of art, notations and other technical terms or terminology used herein have the same meaning as is commonly understood by one of ordinary skill in the art to which this disclosure belongs. All patents, applications, published applications and other publications referred to herein are incorporated by reference in their entirety. If a definition set forth in this section is contrary to or otherwise inconsistent with a definition set forth in the patents, applications, published applications, and other publications that are herein incorporated by reference, the definition set forth in this section prevails over the definition that is incorporated herein by reference.

Unless otherwise indicated or the context suggests otherwise, as used herein, "a" or "an" means "at least one" or "one or more."

This description may use relative spatial and/or orientation terms in describing the position and/or orientation of a component, apparatus, location, feature, or a portion thereof. Unless specifically stated, or otherwise dictated by the context of the description, such terms, including, without limitation, top, bottom, above, below, under, on top of, upper, lower, left of, right of, in front of, behind, next to, adjacent, between, horizontal, vertical, diagonal, longitudinal, transverse, radial, axial, etc., are used for convenience in referring to such component, apparatus, location, feature, or a portion thereof in the drawings and are not intended to be limiting.

Furthermore, unless otherwise stated, any specific dimensions mentioned in this description are merely representative of an exemplary implementation of a device embodying aspects of the disclosure and are not intended to be limiting.

As used herein, the term "adjacent" refers to being near or adjoining. Adjacent objects can be spaced apart from one another or can be in actual or direct contact with one another. In some instances, adjacent objects can be coupled to one another or can be formed integrally with one another.

As used herein, the terms "substantially" and "substantial" refer to a considerable degree or extent. When used in conjunction with, for example, an event, circumstance, characteristic, or property, the terms can refer to instances in which the event, circumstance, characteristic, or property occurs precisely as well as instances in which the event, circumstance, characteristic, or property occurs to a close approximation, such as accounting for typical tolerance levels or variability of the embodiments described herein.

A "molecular assay" as used herein refers to a procedure for specifically detecting and/or quantifying a target molecule, such as a target nucleic acid. A sample containing or suspected of containing the target molecule is contacted with one or more reagents, including at least one reagent specific for the target molecule, and subjected to conditions permissive for generating a detectable signal informative of whether the target molecule is present. For example, where the molecular assay is Polymerase Chain Reaction (PCR), the reagents include primers specific for the target and the generation of a detectable signal can be accomplished at least in part by providing a labeled probe that hybridizes to the amplicon produced by the primers in the presence of the target. Alternatively, the reagents can include an intercalating dye for detecting the formation of double-stranded nucleic acids.

A "reagent" as used herein refers to any substance or combination thereof that participates in a molecular assay, other than sample material and products of the assay. Exemplary reagents include nucleotides, enzymes, amplification oligomers, probes, and salts.

An "assay" as used herein refers to a procedure for detecting and/or quantifying a target molecule in a sample. A sample containing or suspected of containing the target molecule is contacted with one or more reagents and subjected to conditions permissive for generating a detectable signal informative of whether the target molecule is present in the sample or the amount of the target molecule in the sample.

Referring to FIG. 1-3, a container 100 includes a base 102 and a lid 200 disposed on a top end of the base 102. A septum 250 may be disposed between the lid 200 and the base 102 over a top wall aperture 106 formed in the base and below a lid aperture 204 formed in the lid 200.

In various embodiments, base 102 and lid 200 are made from suitable moldable materials, including various plastics, such as polypropylene or cyclic olefin copolymer, polyethylene, polycarbonate, acrylic, or polyvinyl chloride (PVC), and the base 102 and lid 200 may be injection molded. Characteristics of the material used to form the base 102 and lid 200 include chemical compatibility a fluid intended for use with the container 100. In some applications, the material must be inert so that chemicals are not leached into the fluid (e.g., a fluid reagent for performing a molecular assay) and so that the material is not degraded by the fluid. Other characteristics that may be important include manufacturability (i.e., how easily is the material injection molded?), bondability (i.e., how well can the lid 200 be bonded to the base 102?), and ergonomics (e.g., the look and feel in a user's hand).

The septum 250 may be made from an elastomeric material, such as silicone, Viton®, polyurethane, nitrile, butyl, ethylene propylene diene monomer (EPDM), Neoprene, polyethylene, or Santoprene® (dynamically vulcanized EPDM rubber in a thermoplastic matrix of polypropylene).

Referring to FIGS. 4, 5, 8, and 9, the base 102 includes a top wall 104 and a vessel 110 configured to hold a fluid depending from the top wall 104 and extending longitudinally below the top wall 104. The vessel 110 extends from the top wall aperture 106 and includes side walls 114 and a bottom wall 116 at a bottom end 118 of the vessel 110. In the illustrated embodiment, the vessel 110 has a tubular or cylindrical side wall 114 (i.e., a circular transverse profile) with a rounded, interiorly concave bottom wall 116. The vessel 110 may have different shapes and configurations, such as a square or rectangular transverse profile and/or a flat bottom wall.

Referring to FIGS. 1-4, 8, and 9, container 100 further includes a skirt 130 extending from a perimeter 108 (labeled in FIGS. 4 and 5, see also FIGS. 10 and 11) of the top wall 104. In various embodiments, the skirt 130 has a flat bottom edge that extends below the bottom end 118 of the vessel 110. Accordingly, the container 100 may be self-balancing in an upright position when placed with the bottom edge of the skirt 130 supported on a flat surface. Skirt 130 may include a first wall segment 132 oriented transversely to the top wall 104 and depending from a first segment of the perimeter 108 of the top wall 104 and extending longitudinally from the perimeter segment of the top wall to a bottom edge 134 of the first wall segment. First wall segment 132 partially surrounds the vessel 110, and at least a portion of the bottom edge 134 extends below the bottom end 118 of the vessel 110. In the illustrated embodiment, the bottom edge 134 of the first wall segment is substantially straight and parallel to the top wall 104 of the base 102, and thus, the entire bottom edge 134 of the first wall segment 132 extends below the bottom end 118 of the vessel 110.

As best seen in FIGS. 2 and 3, in an embodiment, first wall segment 132 includes an alignment notch 136 formed therein and extending upwardly from the bottom edge 134 of the first wall segment 132. The container 100 may be carried within a recessed pocket of a rack, shelf, conveyor, carousel, etc., (not shown), and a prong or other inward extension (not shown) may be provided within the recessed pocket to extend into and engage the alignment notch 136 of the container 100 placed within the pocket to thereby force a particular, desired orientation of the container 100 within the pocket and prevent the container 100 from rotating within the pocket.

Skirt 130 may further include a second wall segment 138, also oriented transversely to the top wall 104 of the base 102 and depending from a second segment of the perimeter 108 of the top wall 104 and extending longitudinally from the perimeter segment to the bottom edge 142 of the second wall segment 138. In the illustrated embodiment, the bottom edge 142 of the second wall segment 138 is coplanar with the bottom edge 134 of the first wall segment 132.

Figure 4:
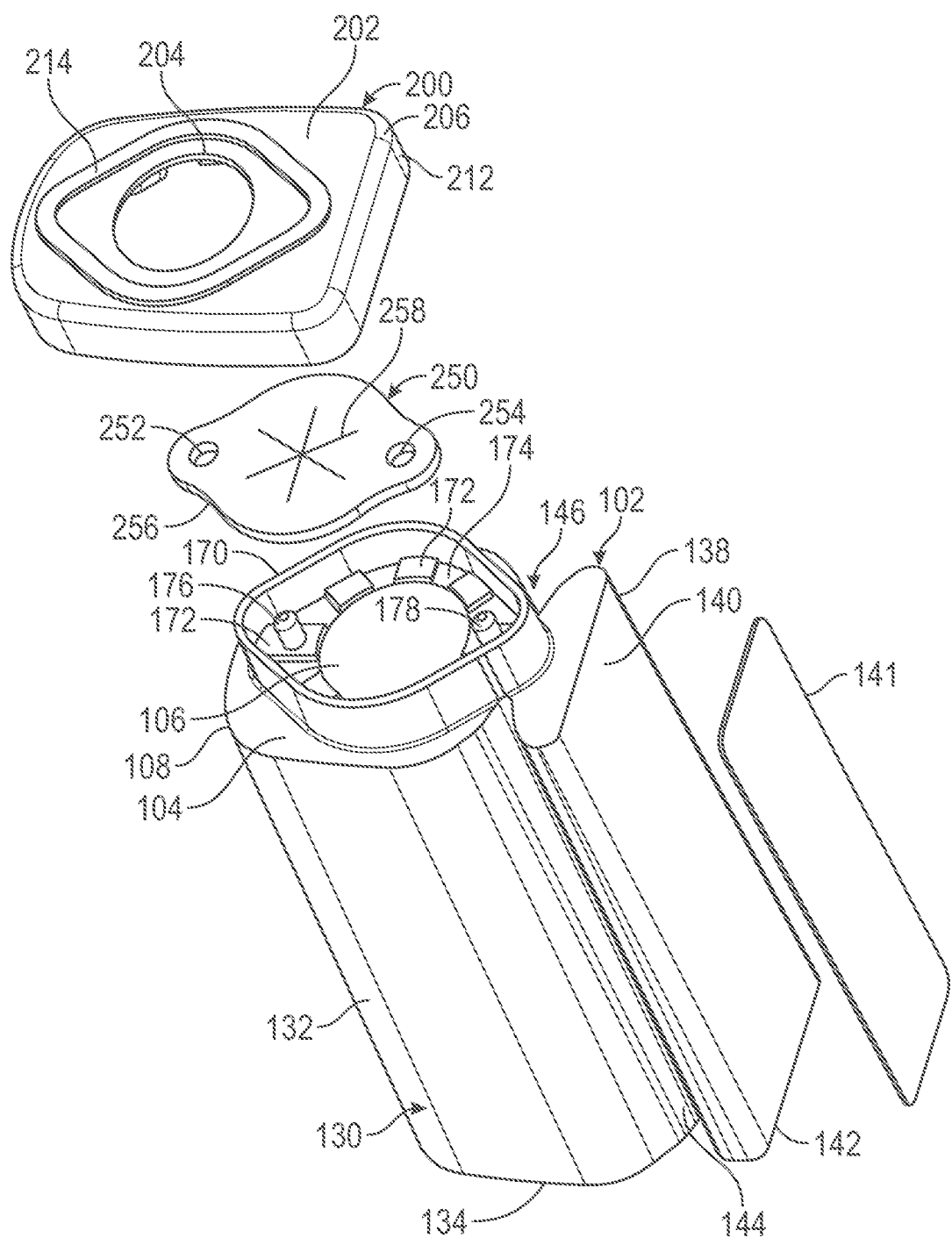
FIG. 4 is an exploded, top, front perspective view of the container.

Second wall segment may include a label panel 140 on which is secured a label 141 (see FIG. 4). Label 141 may be imprinted with identification or other informational indicia related to the container and/or its contents and may include machine-readable indicia such as bar codes or radio frequency ID tags ("RFID"). Label panel 140 may include a single, flat surface as shown in FIG. 5, or it may include a curved surface or two or more discrete flat and/or curved surfaces.

Referring to FIGS. 1-3 and 5, the skirt further includes longitudinally oriented grooves 144, 146 formed on opposed sides of the base 102. Referring more particularly to FIG. 5, groove 144 is defined by exteriorly convex surfaces 148 and 150 (i.e., sides, or walls of the groove) converging towards a root 156 of the groove 144. The root 156 of the groove 144 is the transition between one wall 148 of the groove 144 and an opposite wall 150 of the groove 144. Convergent surface 148 may include part of the first wall segment 132, and converging surface 150 may include part of the second wall segment 138. The root 156 thereby separates the first wall segment 132 and the second wall segment 138. Similarly, groove 146 is defined by exteriorly convex surfaces 152, and 154 (i.e., sides, or walls of the groove) converging towards a root 158 of the groove 146. Converging surface 152 may include part of the first wall segment 132, and converging surface 154 may include part of the second wall segment 138. The root 158 thereby separates the first wall segment 132 and the second wall segment 138.

Referring to FIGS. 4 and 5, a first, or top wall, fluid retainer barrier 170 projects above a top surface 120 of the top wall 104. Top wall fluid barrier 170 may include an upstanding wall oriented transversely to the plane of the top wall 104 and may be substantially perpendicular the top wall 104. Top wall fluid retainer barrier 170 extends continuously around the top wall aperture 106 and is spaced apart from the outer perimeter of the top wall aperture 106. In the illustrated embodiment, top wall fluid retainer barrier 170 has a generally diamond shape with rounded corners.

A plurality of alternating merlons 172 and crenels 174 are disposed on the top wall 104 and surround the top wall aperture 106 within the space between the top wall fluid retainer barrier 170 and the perimeter of the top wall aperture 106. Connecting posts 176, 178 project above the top surface 120 of the top wall 104. The connecting posts 176, 178 may be located at diametrically opposed positions with respect to the top wall aperture 106 and may each be disposed on a respective one of the merlons 172 surrounding the aperture 106.

Referring to FIGS. 4, 6, 7, 10, and 11, the lid 200 includes a cover wall 202 disposed at spaced-apart position above the top wall 104 of the base and has formed therein a lid aperture 204 that is generally aligned with the top wall aperture 106 of the base 102. A perimeter wall, or skirt, 212 is oriented transversely to the cover wall 202 and depends from the perimeter 206 of the cover wall 202. The perimeter wall 212 generally surrounds the top wall fluid retainer barrier 170 of the base 102. As can be appreciated from FIGS. 8 and 9, in an embodiment, at least a portion of the perimeter wall 212 is coplanar with at least a portion of the first wall segment 132 of the skirt 130 of base 102, and a different portion of the perimeter wall 212 is coplanar with at least a portion of the second wall segment 138 of the skirt 130 of the base 102.

Referring to FIGS. 1, 2, 6, 10, and 11, a second fluid retainer barrier, or cover wall fluid retainer barrier, 214 projects above a top surface 208 of the cover wall 202. The cover wall retainer barrier 214 extends continuously around the lid aperture 204 and is spaced from the perimeter of the lid aperture 204.

Figure 10:
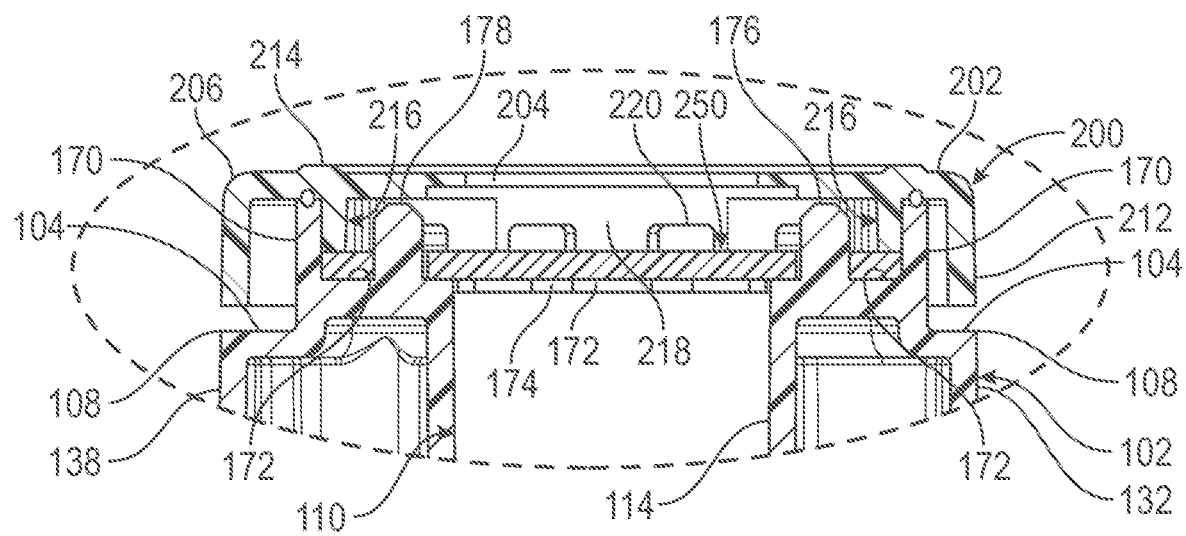
FIG. 10 is an enlarged, partial view of the cross-section shown in FIG. 8.
Figure 11:
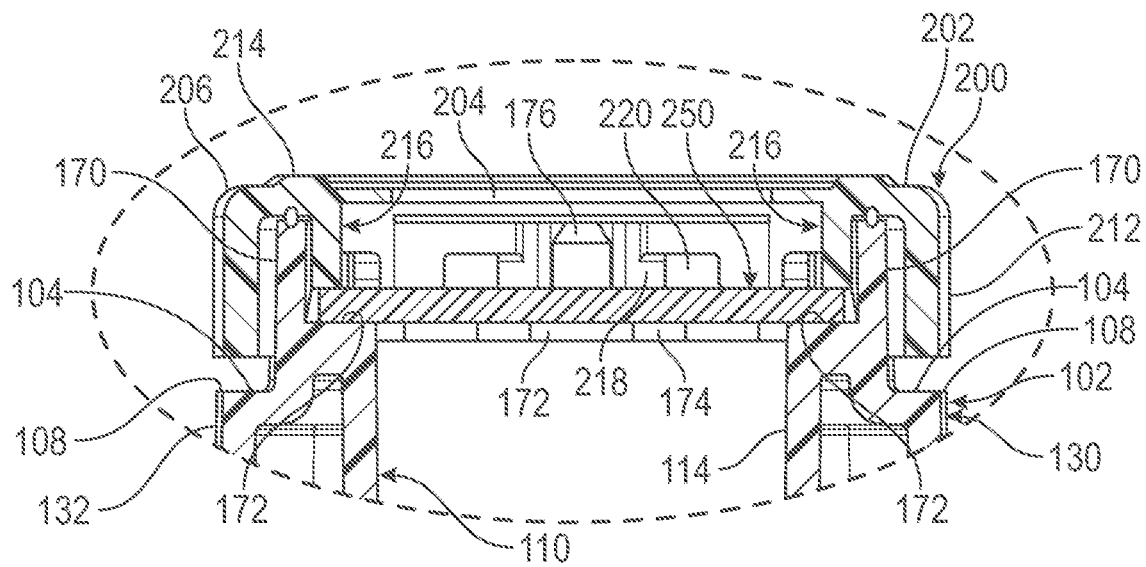
FIG. 11 is an enlarged, partial view of the cross-section shown in FIG. 9.

Referring to FIGS. 7, 10, and 11, a lid wall 216 projects below a bottom surface 210 of the cover wall 202. The lid wall 216 is oriented transversely to the bottom surface of the cover wall 202 and extends continuously around the lid aperture 204 and is spaced from the perimeter of the lid aperture 204. In an embodiment, the lid wall 216 has a similar shape as the top wall fluid retainer barrier 170, which, in the illustrated embodiments, is generally diamond shaped with rounded corners. In some embodiments, the lid wall 216 is configured to have a conforming fit inside the top wall fluid retainer barrier 170, as shown in FIGS. 10 and 11, so that the lid wall has a conforming fit within an interior surface of the top wall fluid retainer barrier 170.

As shown in FIGS. 7, 10, and 11, in an embodiment, a plurality of alternating merlons 218 and crenels 220 form a free edge of the lid wall 216. Each of the plurality of alternating merlons 218 and crenels 220 of the lid wall 216 is disposed in opposed alignment with an associated one of the alternating merlons 172 and crenels 174 of the top wall 104 of the base 102.

In an embodiment, a merlon of the lid wall 216 on each of two opposed sides of the lid aperture 204 defines a post capture pocket 222, 223. Each post capture pocket 222, 223 includes a curved first segment 224, a second segment 232 connected to a first end 226 of the first segment 224 and extending transversely from a concave side of the first segment 224, and a third segment 234 connected to a second end 228 of the first segment 224 and extending transversely from the concave side of the first segment 224. The second segment 232 and the third segment 234 converge toward each other at their free ends, but do not contact each other in the illustrated embodiment. Each post capture pocket 222, 223 is configured to receive a respective one of the connecting posts 176, 178 inserted into a pocket defined between the respective first segment 224, second segment 232, and third segment 234 of thereof.

Friction between the connecting posts 176, 178, the first segment 224, second segment 232, and third segment 234 of each respective post capture pocket 222, 223 at least partially retains the lid 200 on the top end of the base 102. In various embodiments, the lid 200 may be secured to the base 102 by any suitable adhesive. What constitutes a suitable adhesive will depend on the specific polymer material used to form the lid 200 and the base 102. For example, solvent bonding may be possible for PVC or acrylic but not for polypropylene. Various UV cure adhesives could also be considered. Ultrasonic welding or heat stake methods are also possible.

As shown in FIG. 7, in various embodiments, an annular relief 236 is formed on the bottom surface 210 of the cover wall 202. Relief 236 represents an area, or region, of reduced thickness of the cover wall 202. In various embodiments, and as shown in FIG. 7, annular relief surrounds lid aperture 204, such that a radially inner edge of the annular relief 236 is coextensive with the perimeter of the lid aperture 204. In additions portions of a radially outer edge of the annular relief 236 are coextensive with inner surfaces of parts of the lid wall 216. One purpose of the relief 236 is to create as big of a gap possible between the surface of the septum 250 and the underside of the lid 200 to minimize or prevent oil or another fluid from wicking between the lid 200 and the septum 250.

As shown in FIGS. 4, 10, and 11, septum 250 is disposed within the top wall fluid retainer barrier 170 and overlies the top wall aperture 106 and the plurality of alternating merlons 172 and crenels 174 of the top wall 104. In this regard, and as shown in FIG. 4, the septum may have a perimeter shape 256 corresponding to the interior shape of the top wall fluid retainer barrier 170. Septum 250 may be at least partially retained within the top wall fluid retainer barrier 170 by means of the connecting posts 176, 178 extending through holes 252, 254 formed through the septum and aligned with the posts. When the lid 200 is installed on the top end of the base 102, a perimeter 256 of the septum 250 is sandwiched between merlons 172 of the base 102 and opposed, associated merlons 218 of the lid wall 216. Septum 250 may include a plurality of slits 258 formed through a portion of the septum 250 disposed between lid aperture 204 and top wall aperture 106, whereby the slits intersect at a common, central point and or oriented radially with respect to the lid aperture and the top wall aperture. Slits 258 are configured to permit a rigid instrument, such as the probe of a pipettor, (not shown) to pass through the septum 250 and into the vessel 110.

Due to the resiliency of the septum material, the pie-shaped sections of the septum 250 between the slits 258 will deflect downwardly as the rigid instrument is lowered through the slits 258 and into the vessel 110, but will retain at least some contact with the outer surface of the instrument as the instrument is lowered into and then withdrawn from the vessel. In addition, the pie-shaped portions will elastically return toward their undeflected positions after the instrument is removed, thereby providing an at least partial closure for the vessel 110.

The resilient, pie-shaped sections of the septum 250 in contact with the outer surface of the instrument inserted into and removed from the vessel 110 function as wipers to remove at least some excess fluid from the outer surface of the instrument, and at least some of that wiped fluid may be deposited on top of the septum 250. Accordingly, the container 100 may include fluid retainer/return structure that prevents the fluid deposited on the septum 250 from dripping off the container 100 and allows at least a portion of the fluid deposited on the septum 250 to run off the septum and into the vessel 110.

The fluid retainer/return structure may include retainer walls or barriers that prevent fluid deposited on the septum 250 from falling off the container 100 and openings or gaps that permit fluid retained on top of the septum 250 to fall into the vessel 110. In the illustrated embodiment, that fluid retainer/return structure may be provided by the top wall fluid retainer barrier 170, the merlons 172, and the crenels 174 of the base 102 and the lid wall 216, the merlons 218, and the crenels 220 of the lid 200. The fluid retainer/return structure may also include fluid retainer barrier 214 on the cover wall 202 and surrounding the lid aperture 204 to prevent fluid deposited on the cover wall 202 adjacent the cover wall aperture 204 from falling off the container 100.

At least some fluid that is deposited on top of the septum 250 is able to flow to the outer perimeter 256 of the septum 250, where there are gaps between the lid wall 216 and the septum 250 at the crenels 220 formed in the lid wall 216. Fluid flowing to the perimeter 256 can flow around the perimeter, where it is retained by the top wall fluid retainer barrier 170, and then flow through the gaps between the septum 250 and the top wall 104 of the base 102 through the crenels 174 formed in the base 102 and aligned with the crenels 220 formed in the lid wall 216.

Figure 12:
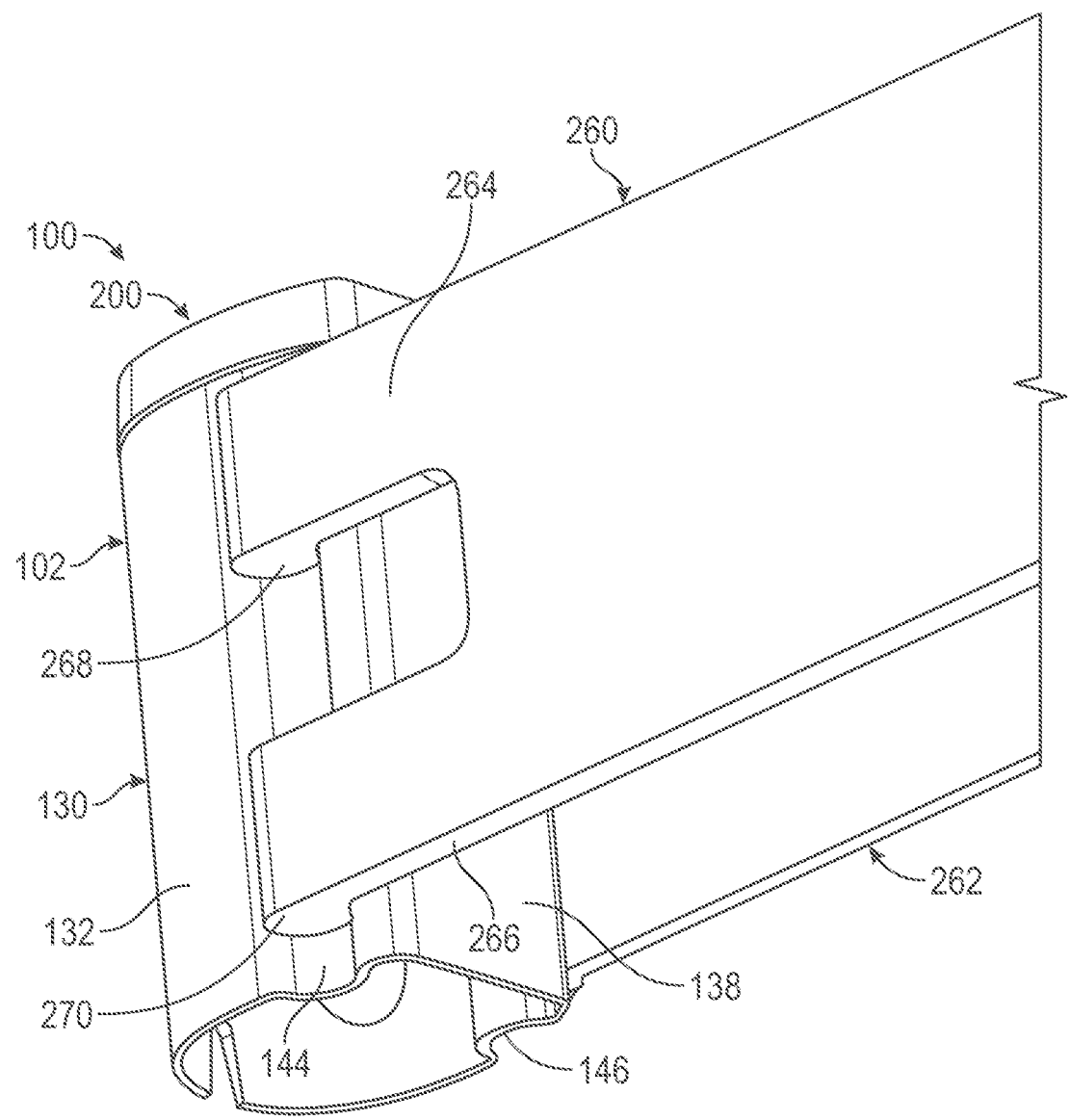
FIG. 12 is a perspective view of a container held within the tongs of a container-gripping mechanism.

FIG. 12 shows a gripping mechanism holding a container 100. The gripping mechanism includes opposed arms 260, 262 that are movable in a clamping fashion toward and away from each other to selectively grip, or grasp, the container 100 or release the container 100, respectively. Each of the opposed arms 260, 262 includes longitudinally spaced fingers, or extensions, 264, 266 (only visible for arm 260). Each of the fingers 264, 266 includes an enlarged tip 268, 270 that extends into the grooves 144, 146 of the container 100.

In an embodiment, the container 100 may include gripping structures, such as grooves 144, 146, configured to enable the gripping mechanism to securely grip the container 100 in a repeatable position and orientation with respect to the opposed arms 260, 262. That is, the gripping structures engaged by container-contacting components of the gripping mechanism result in a securing grasping engagement between the container and the container-contacting components and where the position and orientation of the container with respect to the gripping mechanism is substantially the same each time a container is grasped by the gripping mechanism.

Because each of the grooves 144, 146 includes opposed, exteriorly-convex surfaces 148, 150, 152, 154 (see FIG. 5), the enlarged tips 268, 270 of the fingers 264, 266, of the opposed arms 260, 262 are wedged toward the roots 156, 158 of each of the grooves 144, 146, thereby providing a secure gripping engagement between the enlarged tips 268, 270 and the grooves 144, 146. In addition, the opposed, exteriorly-convex surfaces 148, 150, 152, 154, combined with the longitudinal spacing between the enlarged tips 268, 270 of the fingers 264, 266, provide a self-centering functionality of the fingers 264, 266 and the enlarged tips 268, 270 with respect to the grooves 144, 146. Therefore, for example, if the container 100 is tilted so that one or both grooves 144, 146 is not a aligned with an imaginary, longitudinal line extending through the enlarged tips 268, 270, the container 100 will be reoriented in an upright orientation as the opposed arms 260, 262 close on the container 100 and the enlarged tips enlarged tips 268, 270 wedge into the groove toward the roots 156, 158 at longitudinally-spaced positions. Similarly, if the container is twisted about its longitudinal axis so that one or both of the opposed arms 260, 262 (and its associated enlarged tips, such as enlarged tips 268, 270 for arm 260) is not aligned with the associated groove 144 or 146, the container 100 will be rotated about its longitudinal axis as the opposed arms 260, 262 close on the container 100 and the enlarged tips 268, 270 wedge into each groove toward the roots 156, 158 to align the enlarged tips 268, 270 of both arms 260, 262 with its associated groove 144, 146.

Accordingly, the container 100 can be gripped more securely and with more repeatable positioning than if the container were simply gripped on opposite sides of the skirt 130.

While the subject matter of this disclosure has been described and shown in considerable detail with reference to certain illustrative embodiments, including various combinations and sub-combinations of features, those skilled in the art will readily appreciate other embodiments and variations and modifications thereof as encompassed within the scope of the present disclosure. Moreover, the descriptions of such embodiments, combinations, and sub-combinations is not intended to convey that the claimed subject matter requires features or combinations of features other than those expressly recited in the claims. Accordingly, the scope of this disclosure is intended to include all modifications and variations encompassed within the scope of the following appended claims.

The invention claimed is:

1. A container comprising:
a base, wherein the base comprises:
a top wall;
a fluid vessel depending from the top wall and extending downwardly from a perimeter of a top wall aperture formed in the top wall to a bottom end of the fluid vessel;
a first wall segment oriented transversely to the top wall and depending from a first perimeter segment of the top wall, wherein the first wall segment extends downwardly from the first perimeter segment of the top wall to a bottom edge of the first wall segment and at least partially surrounds the fluid vessel, and wherein at least a portion of the bottom edge of the first wall segment is disposed below the bottom end of the fluid vessel, and further comprising an alignment notch formed in the first wall segment and extending upwardly from the bottom edge of the first wall segment;
a second wall segment oriented transversely to the top wall and depending from a second perimeter segment of the top wall, wherein the second wall segment extends downwardly from the second perimeter segment of the top wall to a bottom edge of the second wall segment;
a groove formed on each of opposed sides of the base, each groove defined by opposed, exteriorly-convex surfaces converging towards a root of each groove, wherein one of the opposed, exteriorly-convex surfaces of each groove comprises part of the first wall segment and the other of the opposed, exteriorly-convex surfaces of each groove comprises part of the second wall segment, and wherein the root of each groove separates the first wall segment and the second wall segment;
a first fluid retainer barrier projecting above a top surface of the top wall, wherein the first fluid retainer barrier extends continuously around the top wall aperture and is spaced from a perimeter of the top wall aperture;
a plurality of alternating merlons and crenels disposed on the top surface of the top wall and surrounding the top wall aperture within the space between the first fluid retainer barrier and the perimeter of the top wall aperture; and
connecting posts projecting above the top surface of the top wall, wherein each of the connecting posts is disposed on an opposed side of the top wall aperture and is disposed on one of the plurality of merlons within the space between the first fluid retainer barrier and the perimeter of the top wall aperture;
a lid disposed on a top end of the base, wherein the lid comprises:
a cover wall disposed at a spaced-apart position above the top wall of the base and having formed therein a lid aperture generally aligned with the top wall aperture of the base;
a perimeter wall oriented transversely to the cover wall and depending from a perimeter of the cover wall, wherein the perimeter wall surrounds the first fluid retainer barrier of the base, and wherein at least a portion of the perimeter wall is coplanar with a first portion of the first wall segment of the base and a second portion of the perimeter wall is coplanar with at least a portion of the second wall segment of the base;
a second fluid retainer barrier projecting above a top surface of the cover wall, wherein the second fluid retainer barrier extends continuously around the lid aperture and is spaced from a perimeter of the lid aperture;
a lid wall projecting below a bottom surface of the cover wall, wherein the lid wall is oriented transversely to the bottom surface of the cover wall and extends continuously around the lid aperture and is spaced from the perimeter of the lid aperture; and wherein the lid wall is configured to have a conforming fit within an interior surface of the first fluid retainer barrier of the base;
a plurality of alternating merlons and crenels forming a free edge of the lid wall, wherein each of the plurality of alternating merlons and crenels of the lid wall of the lid is disposed in opposed alignment with an associated one of the alternating merlons and crenels of the top wall of the base, and wherein a merlon of the lid wall on each of two opposed sides of the lid aperture defines a post capture pocket, wherein the post capture pocket comprises a curved first segment, a second segment connected to a first end of the first segment and extending transversely from a concave side of the first segment, and a third segment connected to a second end of the first segment and extending transversely from the concave side of the first segment, wherein the second and third segments are arranged with converging orientations and wherein each post capture pocket is configured to receive one of the connecting posts between the respective first, second, and third segments thereof; and
an annular relief formed on the bottom surface of the cover wall and having an inner edge that is coextensive with the perimeter of the lid aperture; and
an elastomeric septum disposed within the first fluid retainer barrier and overlying the top wall aperture and the plurality of alternating merlons and crenels of the top wall, wherein the septum is at least partially retained by the connecting posts extending through holes formed through the septum and aligned with the posts, and wherein a perimeter of the septum is sandwiched between merlons of the base and opposed, associated merlons of the lid wall, and wherein the septum includes a plurality of slits formed through a portion of the septum between the lid aperture and the top wall aperture and configured to permit a pipette tip to pass through the septum and into the fluid vessel.

2. A container comprising:
a top wall;
a fluid vessel depending from the top wall and extending downwardly from a perimeter of a top wall aperture formed in the top wall to a bottom end of the fluid vessel;
a first wall segment depending from a first perimeter segment of the top wall, wherein the first wall segment extends downwardly from the first perimeter segment of the top wall to a bottom edge of the first wall segment and at least partially surrounds the fluid vessel, and wherein at least a portion of the bottom edge of the first wall segment is disposed below the bottom end of the fluid vessel;
a second wall segment depending from a second perimeter segment of the top wall, wherein the second wall segment extends downwardly from the second perimeter segment of the top wall to a bottom edge of the second wall segment; and
a groove formed on each of opposed sides of the container, each groove defined by opposed, exteriorly-convex surfaces converging towards a root of each groove, wherein one of the opposed, exteriorly-convex surfaces of each groove comprises part of the first wall segment and the other of the opposed, exteriorly-convex surfaces of each groove comprises part of the second wall segment, and wherein the root of each groove separates the first wall segment and the second wall segment.

3. The container of claim 2, wherein the first wall segment is oriented transversely to the top wall, and the second wall segment is oriented transversely to the top wall.

4. The container of claim 2, wherein the first wall segment includes an alignment notch formed in the first wall segment and extending upwardly from the bottom edge of the first wall segment.

5. The container of claim 2, further comprising a machine-readable label disposed on the second wall segment.

6. The container of claim 2, wherein the first wall segment has a uniform height from the first perimeter segment of the top wall to the bottom edge of the first wall segment.

7. The container of claim 2, wherein the second wall segment has a uniform height from the second perimeter segment of the top wall to the bottom edge of the second wall segment, and wherein the height of the second wall segment is equal to the height of the first wall segment.

8. The container of claim 2, wherein each groove extends from the top wall to the bottom edges of the first wall segment and the second wall segment.

9. The container of claim 2, further comprising a top wall fluid retainer barrier projecting above a top surface of the top wall, wherein the top wall fluid retainer barrier extends continuously around the top wall aperture and is spaced from a perimeter of the top wall aperture.

10. The container of claim 9, further comprising a plurality of alternating merlons and crenels disposed on the top surface of the top wall and surrounding the top wall aperture within the space between the top wall fluid retainer barrier and the perimeter of the top wall aperture.

11. The container of claim 9, further comprising connecting posts projecting above the top surface of the top wall, wherein each of the connecting posts is disposed on an opposed side of the top wall aperture and is disposed within the space between the top wall fluid retainer barrier and the perimeter of the top wall aperture.

12. The container of claim 2, further comprising a lid, wherein the lid comprises:
a cover wall disposed at a spaced-apart position above the top wall and having formed therein a lid aperture generally aligned with the top wall aperture; and
a perimeter wall depending from a perimeter of the cover wall.

13. The container of claim 12, wherein the perimeter wall is oriented transversely to the cover wall.

14. The container of claim 12, wherein at least a portion of the perimeter wall is coplanar with at least a portion of the first wall segment and a second portion of the perimeter wall is coplanar with at least a portion of the second wall segment.

15. The container of claim 12, further comprising a cover wall fluid retainer barrier projecting above a top surface of the cover wall, wherein the cover wall fluid retainer barrier extends continuously around the lid aperture and is spaced from the perimeter of the lid aperture.

16. The container of claim 12, further comprising a lid wall projecting below a bottom surface of the cover wall, wherein the lid wall extends continuously around the lid aperture and is spaced from a perimeter of the lid aperture.

17. The container of claim 16, wherein the lid wall is oriented transversely to the bottom surface of the cover wall.

18. The container of claim 16, wherein the lid wall comprises a plurality of alternating merlons and crenels forming a free edge of the lid wall.

19. The container of claim 12, further comprising an annular relief formed on the bottom surface of the cover wall and having an inner edge that is coextensive with the perimeter of the lid aperture.

20. The container of claim 11, further comprising an elastomeric septum disposed within the top wall fluid retainer barrier and overlying the top wall aperture, wherein the septum is at least partially retained by the connecting posts extending through holes formed through the septum and aligned with the posts, and wherein the septum includes a plurality of slits formed through a portion of the septum overlying the top wall aperture and configured to permit a pipette tip to pass through the septum and into the fluid vessel.

21. The container of claim 9, further comprising a lid, wherein the lid comprises:
a cover wall disposed at a spaced-apart position above the top wall and having formed therein a lid aperture generally aligned with the top wall aperture; and
a perimeter wall depending from a perimeter of the cover wall, wherein the perimeter wall surrounds the top wall fluid retainer barrier.

22. The container of claim 21, further comprising a lid wall projecting below a bottom surface of the cover wall, wherein the lid wall extends continuously around the lid aperture and is spaced from the perimeter of the lid aperture, and wherein the lid wall is configured to have a conforming fit within an interior surface of the top wall fluid retainer barrier.

23. The container of claim 22, wherein the lid wall is oriented transversely to the bottom surface of the cover wall.

24. The container of claim 22, further comprising an annular relief formed on the bottom surface of the cover wall and having an inner edge that is coextensive with the perimeter of the lid aperture.

25. The container of claim 10, further comprising a lid, wherein the lid comprises:
   a cover wall disposed at a spaced-apart position above the top wall and having formed therein a lid aperture generally aligned with the top wall aperture;
   a perimeter wall depending from a perimeter of the cover wall, wherein the perimeter wall surrounds the top wall fluid retainer barrier;
   a lid wall projecting below a bottom surface of the cover wall, wherein the lid wall extends continuously around the lid aperture and is spaced from a perimeter of the lid aperture; and
   a plurality of alternating merlons and crenels forming a free edge of the lid wall, wherein each of the plurality of alternating merlons and crenels of the lid wall of the lid is disposed in opposed alignment with an associated one of the alternating merlons and crenels of the top wall.

26. The container of claim 25, wherein the lid wall is configured to have a conforming fit within an interior surface of the top wall fluid retainer barrier such that at least a portion of the lid wall is in contact with the interior surface.

27. The container of claim 25, further comprising an annular relief formed on the bottom surface of the cover wall and having an inner edge that is coextensive with the perimeter of the lid aperture.

28. The container of claim 25, further comprising an elastomeric septum disposed within the top wall fluid retainer barrier and overlying the top wall aperture and the plurality of alternating merlons and crenels of the top wall, wherein a perimeter of the septum is sandwiched between merlons of the top wall and opposed, associated merlons of the lid wall, and wherein the septum includes a plurality of slits formed through a portion of the septum between the lid aperture and the top wall aperture and configured to permit a pipette tip to pass through the septum and into the fluid vessel.

29. The container of claim 2, wherein the container is made of plastic and is at least partially translucent.

30. The container of claim 2, wherein the fluid vessel contains a reagent for performing a molecular assay.

* * * * *

UNITED STATES PATENT AND TRADEMARK OFFICE
CERTIFICATE OF CORRECTION

| | |
|---|---|
| PATENT NO. | : 11,794,189 B2 |
| APPLICATION NO. | : 17/210040 |
| DATED | : October 24, 2023 |
| INVENTOR(S) | : David Buse and Byron J. Knight |

It is certified that error appears in the above-identified patent and that said Letters Patent is hereby corrected as shown below:

In the Specification

In Column 3, Line 22, delete "wall a" and insert -- wall of a --, therefor.

In Column 10, Line 22, delete "FIG. 1-3," and insert -- FIGS. 1-3, --, therefor.

In Column 11, Line 66, delete "the" and insert -- to the --, therefor.

In Column 13, Line 23, delete "additions" and insert -- addition, --, therefor.

In Column 13, Line 26, delete "possible" and insert -- as possible --, therefor.

In Column 14, Line 64, delete "a aligned" and insert -- aligned --, therefor.

Signed and Sealed this
Thirtieth Day of January, 2024

*Katherine Kelly Vidal*

Katherine Kelly Vidal
*Director of the United States Patent and Trademark Office*